(12) United States Patent
Picot et al.

(10) Patent No.: US 8,935,836 B2
(45) Date of Patent: Jan. 20, 2015

(54) CONNECTION ELEMENT FOR FORMING THE MALE PORTION OF AN AUTOMATIC FASTENER

(75) Inventors: Lionel Picot, St. Laurent des Autels (FR); Jean-Pierre Ducauchuis, Nantes (FR)

(73) Assignee: Aplix, Paris (FR)

( * ) Notice: Subject to any disclaimer, the term of this patent is extended or adjusted under 35 U.S.C. 154(b) by 328 days.

(21) Appl. No.: 13/318,378

(22) PCT Filed: Apr. 30, 2010

(86) PCT No.: PCT/FR2010/000339
§ 371 (c)(1),
(2), (4) Date: Nov. 1, 2011

(87) PCT Pub. No.: WO2010/130886
PCT Pub. Date: Nov. 18, 2010

(65) Prior Publication Data
US 2012/0047695 A1    Mar. 1, 2012

(30) Foreign Application Priority Data
May 15, 2009   (FR) .................................... 09 02358

(51) Int. Cl.
*A44B 18/00*    (2006.01)
*B28B 1/28*     (2006.01)

(52) U.S. Cl.
CPC ................... *A44B 18/0065* (2013.01)
USPC .................. 24/452; 24/450; 24/442

(58) Field of Classification Search
CPC ........... A44B 18/0061; A44B 18/0049; A44B 18/0003; F16B 5/07; B29C 43/222
USPC .................. 24/449, 450, 452, 442, 451, 448, 24/443–447
See application file for complete search history.

(56) References Cited

U.S. PATENT DOCUMENTS

| | | | |
|---|---|---|---|
| 3,708,833 A * | 1/1973 | Ribich et al. ..................... | 24/450 |
| 4,894,060 A * | 1/1990 | Nestegard ...................... | 604/391 |
| 5,339,499 A * | 8/1994 | Kennedy et al. ................ | 24/452 |
| 5,657,517 A * | 8/1997 | Akeno et al. .................... | 24/452 |
| 5,755,015 A * | 5/1998 | Akeno et al. .................... | 24/452 |
| 5,781,969 A * | 7/1998 | Akeno et al. .................... | 24/452 |
| 6,209,177 B1 * | 4/2001 | Murasaki ........................ | 24/452 |
| D516,952 S * | 3/2006 | Kingsford et al. ........... | D11/200 |
| 7,516,524 B2 * | 4/2009 | Provost et al. .................. | 24/452 |
| 7,520,033 B2 * | 4/2009 | Clarner .......................... | 24/452 |
| RE42,475 E * | 6/2011 | Armela et al. ................ | 428/120 |
| 2003/0106188 A1 | 6/2003 | Armela et al. | |
| 2013/0133176 A1* | 5/2013 | Takehara et al. ........... | 29/525.03 |

* cited by examiner

Primary Examiner — Robert J Sandy
Assistant Examiner — Rowland Do
(74) Attorney, Agent, or Firm — Renner, Kenner, Greive, Bobak, Taylor & Weber

(57) ABSTRACT

A sheet having fastening elements, including a base strip made of thermoplastic material and at least one element made from the strip, the element including a stem extending in a transverse, in particular vertical, direction to the plane of the base strip, and having a cross section which is substantially uniform or decreases from the base strip towards the apex of the stem, in particular as far as the apex of the stem, and a part forming a head which protrudes laterally from the apex of the stem.

11 Claims, 7 Drawing Sheets

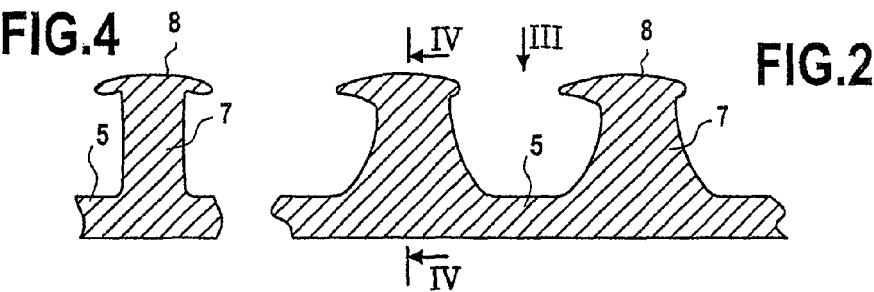
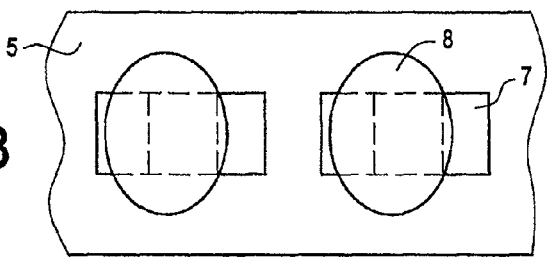
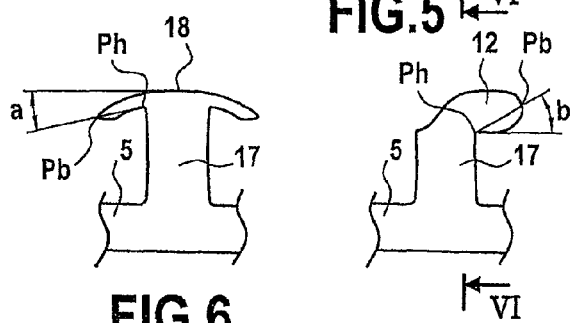
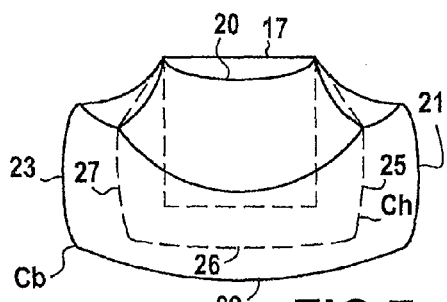
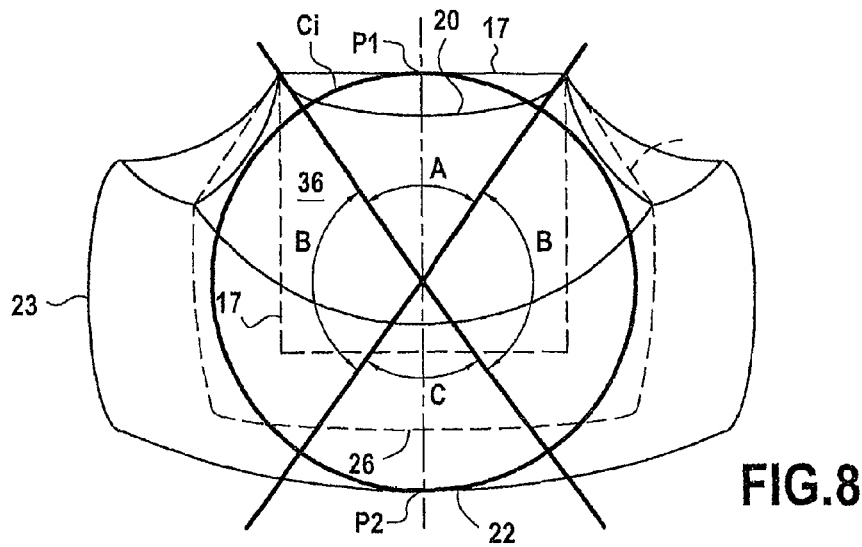

CONNECTION ELEMENT FOR FORMING THE MALE PORTION OF AN AUTOMATIC FASTENER

The present invention relates to a sheet having fastening elements intended to form the male part of a touch-and-close element of the (male-female) hook-and-loop type which consists of a sheet, in particular made of thermoplastic material, from which protrude the fastening elements comprising a stem extending transversely, in particular substantially perpendicular, relative to the sheet and terminated by a head which protrudes laterally from the stem.

The present invention also relates to a method for manufacturing a sheet of this type, in addition to an installation for manufacturing a sheet of this type.

In order to manufacture sheets having mushroom-shaped hooks, i.e. consisting of a strip made of thermoplastic material, from which mushroom-shaped fastening elements protrude, each consisting of a stem substantially perpendicular to the sheet and consisting of a head part which protrudes laterally from the stem all around said stem, it is already known in the prior art to extrude a thermoplastic material from an extruder to shape and convey a sheet, substantially in a form which hereinafter will be referred to as molten and which, without being liquid, is nevertheless not completely solid but is partially softened, between a pressing roller and a forming roller, the forming roller comprising cavities having a complementary stem shape, such that when the sheet is passed between the two rollers, after solidification of the material, a sheet is obtained at the outlet comprising substantially cylindrical or conical stems which are subsequently deformed by pressing and/or by heating the upper part to form a mushroom-shaped fastening head.

These fastening elements made from the sheet are intended to cooperate with loops of a loop part consisting, for example, of a looped (knitted or woven) fabric, in particular made on a three-bar loom comprising warp threads, weft threads and loop threads, or a non-woven fabric forming loops.

It is desirable to provide fastening elements which, when they cooperate with the loop parts, have the greatest possible tensile strength and/or peel strength.

In the present application, by the projecting fastening angle of the curvature of the lower surface of the head in a given longitudinal radial half-section plane (relative to the median longitudinal axis of the stem, in particular the vertical axis passing through the centre of the stem), or left, respectively right, fastening angle, is understood the angle α formed in the given radial longitudinal half-section plane between, on the one hand, the axis (conventionally the horizontal axis) perpendicular to the longitudinal axis of the stem (conventionally the vertical axis) and the straight line passing through the two points Ph and Pb of the given radial plane defined as being respectively, for Pb, the point of the head which is the most remote from the stem in this radial half-plane, and Ph, the first point of the lower surface of the head of the fastening element, leaving the stem and passing towards the point Pb where the tangent at this lower surface is the least inclined (in absolute value) relative to said perpendicular axis (conventionally the horizontal axis), in particular is parallel thereto. In particular, when the lower surface comprises a highest point which is different from the point Pb which is the most remote from the stem, it is at this point that the tangent is the least inclined and, in particular, is parallel to the perpendicular axis, which is conventionally the horizontal axis.

When the straight line PhPb is inclined downwards relative to the axis (conventionally the horizontal axis) perpendicular to the longitudinal axis of the stem, the fastening angle is negative and when it is inclined upwards the angle is positive.

According to the invention, a sheet having fastening elements, comprising a base strip, in particular made of thermoplastic material and at least one fastening element made from the strip, the fastening element consisting of a stem part and a head part protruding laterally from the stem, the head comprising two left and right wings protruding laterally from the stem in a transverse direction, or CD, respectively having a fastening angle which is the greatest to the left and right; and on the other hand, radially between the two wings, a rear projecting part, protruding from the stem on the rear side in a direction MD perpendicular to the direction CD, having a fastening angle which is the greatest to the rear, is characterised in that the two fastening angles which are the greatest to the left and right are greater than the fastening angle which is the greatest to the rear.

Thus, according to the invention, the head has a shape which proves advantageous in terms of the cooperation of the fastening element with the loops, said loops being able to be easily hooked along certain "approach axes", and then being better supported by the parts which protrude the most.

Preferably, the greatest fastening angles to the left and right are strictly positive, whilst the fastening angle to the rear is zero or less than zero.

Preferably, the head, on a front part, i.e. on the side opposing the projecting part, does not protrude laterally from the stem.

According to a further embodiment, on the front part, the head also protrudes from the stem, such that the head protrudes from the stem over 360° and the fastening element is thus mushroom-shaped.

According to a preferred embodiment of the invention, in longitudinal section in the direction CD, the two left and right wings are substantially symmetrical relative to the central longitudinal plane MD.

According to a preferred embodiment of the invention, the distance by which each wing protrudes on the left or right side in the transverse direction increases gradually from the front side passing in the direction towards the rear side and as far as an intermediate point which is the most remote from the stem.

Preferably, the stem has a shape which is polygonal, in particular substantially rectangular or square in cross section, preferably having a ratio of the greatest longitudinal dimension to the greatest lateral dimension which is strictly between 1 and 2, the longitudinal dimension extending preferably in the direction MD.

According to a preferred embodiment, the head comprises two protuberances in the form of ribs which extend from edges of the stem formed by its rear corners to the external edge of the head, in particular as far as the points of the external edge where the wings respectively to the left or right and the rear projecting part are joined.

Preferably, each rib has a ridge continuing from the respective edge of the stem from which it extends.

Preferably, the defining plane between the head and the stem is inclined downwards in the direction towards the rear relative to the plane of the base.

Preferably, on the side opposing the rear projecting part, the upper surface of the head comprises a concave region of which the concavity is turned in a direction which is away from the fastening element, this concave region being defined to the rear by a ridge line and to the front by the stem-head defining plane.

Preferably, the ridge line comprises two right and left apexes which are the two highest points of the head respectively to the right and to the left of the front-rear axis of the head passing through the axis of the stem.

Preferably, the two apexes are closer to the front edge than the rear edge.

These two apexes have the function of guiding the loops in an optimal manner, either to divert them towards the fastening element along the side opposing the projecting part, or to divert them to the wings, thus promoting the best possible hooking of the loops.

The present invention also relates to a method for manufacturing a sheet having fastening elements, in particular a sheet having fastening elements according to the invention.

According to the invention, a method for manufacturing a sheet having fastening elements comprises the steps in which: a sheet having preforms is conveyed comprising a base strip and at least one preform protruding transversely, in particular substantially perpendicular, from the sheet, the at least one preform being, for example, a cylindrical stem or stems of square or rectangular and/or conical shape;
said sheet having preforms is passed into an interstice formed between a curved or straight support surface of a support element, in particular a support roller, the support being such that the sheet is in contact with the support surface with its side without preforms, and a curved or straight pressing surface of a pressing element, the concavities of the two support and pressing surfaces being turned in the same direction, the interstice having an inlet thickness and an outlet thickness which is less than the inlet thickness, the support element driving the sheet having preforms at a driving speed whilst the pressing surface is fixed or is displaced at a speed which is less than the driving speed;
the total height consisting of the sum of the thickness of the base strip and of the height of each preform being greater than the thickness at a point located between the inlet and the outlet, this point being able to be the inlet and the thickness of the interstice decreasing from this point to the outlet, in particular as far as the outlet, such that the preforms are deformed by increasing compression towards the outlet, to obtain thus a sheet having fastening elements.

According to a first preferred embodiment, the support element is a roller and the pressing element has a circular cylindrical surface of which the concavity is turned towards the support element, the arrangement of the two elements being such that the interstice formed between the two decreases from the inlet to the outlet of the interstice.

According to a preferred embodiment of the invention, one of the elements is maintained at ambient temperature, whilst the other element is heated, in particular to a softening temperature (i.e. beyond the limit of elastic deformation) between 100° C. and 165° C., in particular when the thermoplastic material is a polyolefin, for example a PE (polyethylene) or a PP (polypropylene) or a copolymer.

Preferably, the element maintained at ambient temperature is the support element, i.e. the element on the side of the sheet opposing the stems, whilst the heated element is the pressing element.

Preferably, the preform consists of a stem and a head protruding from the stem in the direction of the front of the sheet, and at the outlet of the decreasing interstice, after deformation of the head by the hot pressing surface and by the friction caused, fastening elements according to the invention are obtained having a part projecting in the direction of the rear of the sheet, i.e. on the opposing side relative to the head of the preform and, in particular, on the side opposing the direction of conveyance of the product.

Thus a fastening element is obtained having an overhang and/or an asymmetrical projection, in particular, as according to the invention.

Preferably, the sheet having preforms conveyed into the interstice is obtained by conveying a sheet having stems comprising a base strip and stems protruding transversely, in particular substantially perpendicular, from the sheet, being in particular of cylindrical shape, in particular polygonal, in particular square or rectangular and/or conical, between a preliminary support element, in particular a preliminary support roller and a preliminary pressing element, in particular a preliminary pressing roller;
a preliminary interstice being formed between the two preliminary support and pressing elements such that the stems are compressed by the preliminary pressing element against the preliminary support element such that at the outlet of the preliminary interstice said sheet having preforms is obtained, comprising a sheet and preforms which have at their end a head part which protrudes laterally, the height of the preforms being less than the height of the stems upstream of the preliminary interstice between the two preliminary support and pressing elements;
the preliminary support element being displaced at a first speed ($V_1$) measured in the direction of conveyance of the sheet in the region of the preliminary interstice and the preliminary pressing element displaced at a second speed ($V_2$) measured in the direction of conveyance of the sheet in the region of the preliminary interstice, the two speeds being different from one another, in particular in absolute values.

If the speed of the preliminary pressing element or roller is greater than the speed of the preliminary support element or roller, a shape is obtained for the preforms known as that of a "peaked cap" with an overhang to the front of the stem in the machine direction (the example shown in FIG. 1) whilst in the reverse case, the overhanging shape known as that of a "peaked cap" is obtained to the rear of the stem in the machine direction.

Preferably, the preliminary support element and the support element are formed by the same element, in particular a roller of which one portion serves as a preliminary support roller and a further portion as a support roller.

Preferably, the two preliminary support and pressing elements are rollers which have an identical radius and their centres are arranged on a perpendicular relative to the sheet which moves past.

Preferably, a return roller is provided in front of the preliminary interstice.

The present invention also relates to an installation for manufacturing a sheet having fastening elements, in particular according to the invention.

According to the invention, the installation intended for manufacturing a sheet having fastening elements comprises a support element, in particular a roller, having a curved or straight support surface and a pressing element having a curved or straight pressing surface, the two support and pressing surfaces being arranged having their concavity turned in the same direction so as to form an interstice therebetween, and means intended to convey a sheet having preforms to make it pass into the interstice between the two elements such that the sheet is supported by its side without preforms, the interstice extending between an inlet and an outlet, and at least over one portion preferably between the inlet and the outlet, the thickness of the interstice decreasing towards the outlet; the support element driving the sheet at a driving speed whilst the pressing surface is fixed or displaced at a speed which is less than the driving speed.

According to a preferred embodiment, the support element is a roller and the pressing element comprise a curved pressing surface having its concavity turned towards the support roller, this surface consisting in section, in particular, of a circular arc.

According to a preferred embodiment, a preliminary support element, in particular a preliminary support roller, and a preliminary pressing element, in particular a preliminary pressing roller, are provided upstream, a preliminary interstice being formed between the two preliminary elements, and the preliminary pressing element having a first displacement speed V1 in the region of the preliminary interstice, measured in the direction of conveyance, and the preliminary support element having a second displacement speed V2 in the region of the preliminary interstice, measured in the direction of conveyance, which is different from the speed $V_1$.

Preferably, the preliminary pressing element is heated to a temperature which is greater than the temperature of the preliminary support element, in particular to a softening temperature of between 100° and 165° in the case where the thermoplastic material is a polyolefin, for example a PE or a PP or a copolymer, and the support element is at a substantially ambient temperature, in particular between 20° and 40° C.

Preferably, the preliminary support element is a roller and the support element consists of the same roller, a sector of the roller forming the preliminary support element whilst a further sector of the roller forms the support element.

Preferably, the pressing element is brought to a temperature of between 100° C. and 160° C.

By way of example, an embodiment is now described of a device according to the invention and sheets having stems obtained according to the invention by referring to the drawings, in which:

FIG. 2 is a view along a median longitudinal section of part of a sheet having preforms, before its entry into the interstice of decreasing thickness;

FIG. 3 is a view from above (along the line III of FIG. 2) of the sheet having preforms of FIG. 2;

FIG. 4 is a view in cross section along the line IV-IV of FIG. 2, this line passing substantially through the central axis of the stem;

FIG. 5 is a view along a longitudinal section of part of a sheet having fastening elements obtained at the outlet of the interstice of decreasing thickness;

FIG. 6 is a view in section along the line VI-VI of FIG. 5, this line passing substantially through the central axis of the stem;

FIG. 7 is a view from above (along the line VII of FIG. 5) of the sheet part of FIG. 5;

FIG. 8 is a view identical to FIG. 7 in larger scale showing the circle circumscribed by the head and the angles A, B and C;

Figure 1:
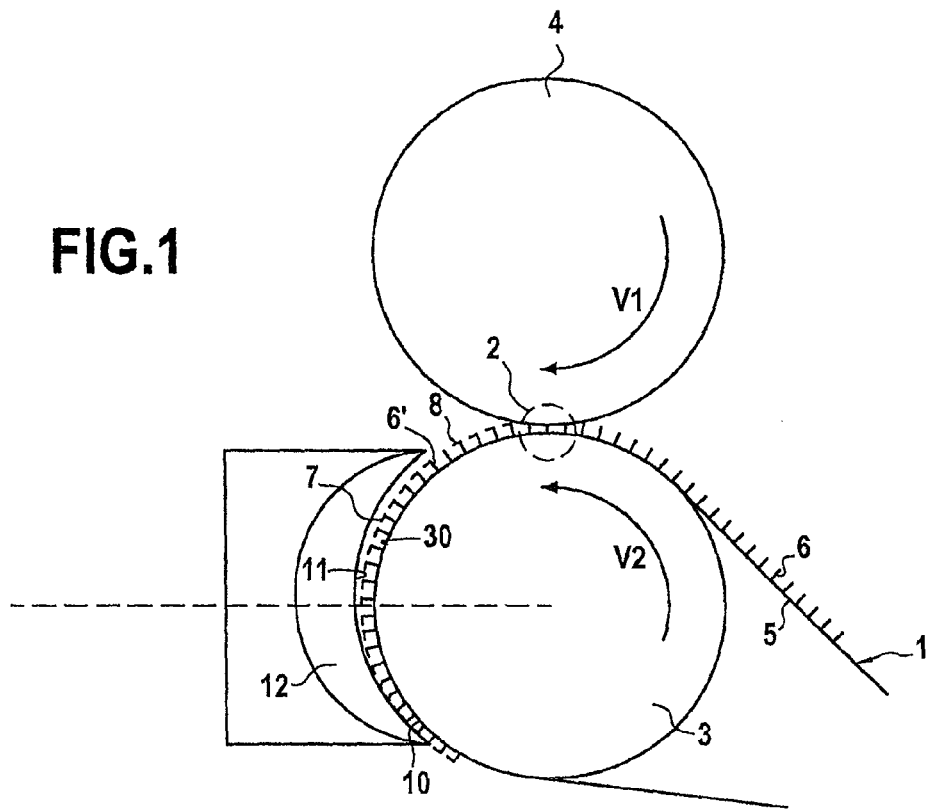
FIG. 1 is a schematic view of an installation according to the invention in which the conveyed sheet having fastening elements is also shown.
Figure 10:
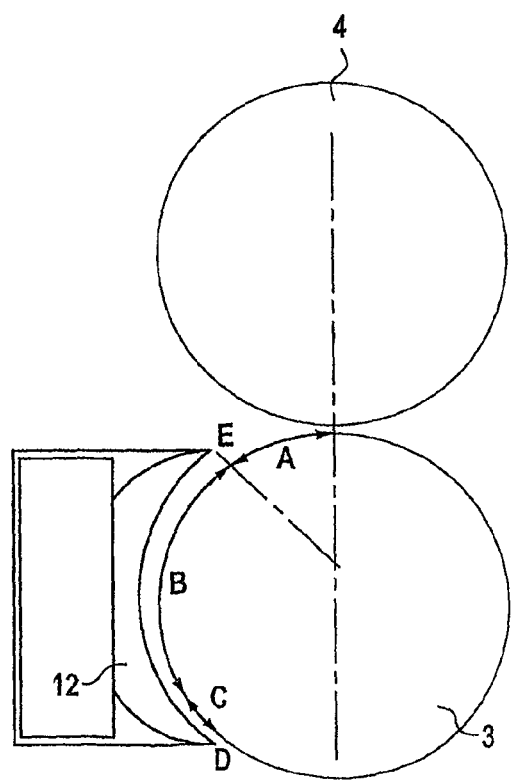
FIG. 10 is a view of the installation of FIG. 1 without the conveyed sheet.

In FIG. 1, an installation for manufacturing a sheet having fastening elements is shown schematically.

A sheet 1 having cylindrical stems, for example of polygonal, for example square or rectangular, or elliptical, in particular circular, or similar and/or conical cross sections is conveyed from a device for forming sheets having stems, not shown, which comprises, conventionally, a forming roller, comprising cavities having shapes complementary to the stems which are desired to be formed, and a pressing roller, said rollers being remote from one another to form an interstice into which a thermoplastic material is brought by means of extrusion, in the form of a sheet of material which is neither entirely solid nor liquid to force the material into the moulding cavities so that, at the outlet, the sheet 1 having stems is obtained by moulding in the cavities, having stems of a shape which is complementary to that of the cavities, in particular of cylindrical shape, for example polygonal, in particular square or rectangular, or elliptical, in particular circular, and/or slightly conical.

This sheet having stems 1 is then conveyed (in particular by means of a return roller) into a first interstice 2 (preliminary interstice) formed between a support roller 3 (preliminary support roller) and a first pressing roller 4 (preliminary pressing roller).

The two rollers have substantially the same diameter.

As viewed in FIG. 1, the support roller 3 rotates at a rotational speed in the anticlockwise direction, so as to drive the sheet 1. The pressing roller 4 rotates in the opposing direction. It could also rotate in the same direction. The interstice 2 between the two rollers has a depth which consists of the smallest distance measured between the two rollers along a line passing through their respective centres, which is adjusted to be less than the total height of the strip 5 of the sheet and of a stem 6 of the sheet having stems, conveyed upstream of said interstice.

The preliminary pressing roller 4 is heated to a temperature which is greater than the temperature of the support roller which, itself, is preferably maintained at ambient temperature. In particular, when the thermoplastic material is a polyolefin, the preliminary pressing roller 4 is heated to a temperature of between 110 and 165° C. This temperature has to be less than the melting temperature of the thermoplastic material which passes between the two rollers and which forms the sheet having stems.

The rotational speed of the preliminary pressing roller 4 and the speed of the preliminary support roller 3 are selected so that the speed V1, measured in the direction of conveyance of the sheet in the region of the preliminary interstice, of the pressing roller is different from the speed V2, measured in the same direction of conveyance in the region of the interstice (i.e. tangentially to the two rollers in the region where they form the interstice) of the support roller.

In particular in the embodiment shown, the speed V1 is greater than V2, in particular 5 to 20% greater, the speed V2 being able, in particular, to be between 5 and 15 m/min. When the two speeds are directed in opposing directions, they are measured in the direction of V2, V1 thus having negative speed and thus less than V2.

At the outlet of the first interstice 2 between the two preliminary rollers 3 and 4, the sheet having stems becomes a sheet having fastening elements or preforms comprising a base 5 and fastening elements 6' consisting of a stem 7 and a head 8. The head 8 protrudes from the stem in the forward direction relative to the direction of conveyance. The sheet, still supported by the support roller 3, is conveyed into a second interstice 10.

This interstice 10 extends along the circular periphery of the roller 3, over a circular arc of a length of 200 mm.

This interstice is formed between, on the one hand, a portion of the external surface of the support roller 3 and, on the other hand, a curved surface 11 which is circular in cross section (plane of the figure) of a pressing element 12. The interstice extends between an inlet point E and an outlet point D. The depth of the interstice, i.e. the distance between the two opposing surfaces, namely the surface 11 and the portion 30 of the external surface of the roller 3, decreases from the point E to the point D, i.e. decreases in the direction in which the strip is conveyed. The depth is measured in the radial direction (perpendicular to the tangent) of the external surface of the roller 3. It is approximately 1 mm at the inlet and approximately 0.4 mm at the outlet. Over a first length B of the interstice 10, the thickness is greater than the total height of the strip 5, and of a preform 6' emerging from the first interstice. After this first length, during which the sheet and the preforms are preheated, the sheet enters a second length C of which the depth is equal to and then less than the total height of the strip 5 and a preform 6', so that contact is made with the surface 11, a contact where the pressure increases as the outlet D is approached. Over this length C, the definitive shape of the head is produced.

The pressing element 12 is fixed (zero speed of displacement). It could also be mobile, but always such that its speed it less than V2 when measured in the direction of V2.

The concavities of the opposing surfaces 11 and 30 are turned in the same direction, namely towards the centre of the support roller 3. If required, either of these two surfaces or both surfaces are rectilinear or substantially rectilinear.

The elements, in particular pressing elements, are generally made of metallic material, in particular hard material. They may, however, also be made of other materials able to tolerate temperatures in the order of 160° C.

Similarly, the support roller is made of metal. It may, however, also be made of any other material tolerating temperatures in the order of 40° (rubber, thermoplastic, etc.).

In FIG. 2, a view in longitudinal section is shown, i.e. in a plane which is both parallel to the direction MD (machine direction) and perpendicular to the base plane of the sheet, of a sheet having preforms at the outlet of the first preliminary interstice between the two preliminary support and pressing rollers 3 and 4. A preform 6' made from the base 5 of the sheet in the vertical or perpendicular direction relative to the base consists of a stem 7 of which the cross section, i.e. in a plane parallel to the base 5, is substantially uniform or strictly decreases towards its apex and as far as its apex (this is the case shown in the figures). This stem 7 is extended at its upper end or apex by a head part 8 which protrudes laterally from the stem 7. In the view in longitudinal section shown in FIG. 2, which is a substantially median section of the preform, the head part 8 protrudes at the front side (to the left in the figure) of the machine direction and does not protrude at the rear side (or right side of the figure), and in particular at the rear side does not have a fastening capacity. The head part 8 has, viewed from above as in FIG. 3, an upper surface having in section a substantially oval or elliptical shape. It protrudes from the stem over a large part of the circumference of the stem, with the exception of a rear part which extends over an arc of the periphery of the stem corresponding to approximately 25% of the total periphery of the head. This percentage may, according to the invention, vary by 15% to 50%. This corresponds, in the case of a circular head, to an angular section between approximately 50° and 170°, in particular approximately 90°.

The part of the head which does not protrude is located in this embodiment at the rear end, as the preliminary pressing roller rotates more rapidly than the support roller.

In FIG. 4, one of the preforms of FIG. 2 is shown along a sectional view in the transverse direction (CD). The head part 8 protrudes on both the left and right sides of the stem by a distance which in this case is substantially equal. The distance measured in the direction CD, of which the head part 8 protrudes from the left and right sides in the direction CD (cross direction) relative to the stem 7 increases at the rear side of the stem where it is zero, passing as far as the front side of the stem where it is at a maximum.

In cross section, the stem may have a rectangular, square, polygonal, circular, oval or similar section. Preferably, as shown in the figures, it is rectangular, having a ratio of its length to its width which is preferably between 1 and 2. In particular, its length is oriented in the direction MD and its width is oriented in the direction CD.

In FIGS. 5 to 9 and 11 to 15, the sheet having fastening elements is shown, as obtained at the outlet of the interstice 10. Each fastening element consists of a stem part 17 having a cross section (i.e. perpendicular to the direction in which the axis of the stem extends, a direction which in this embodiment is vertical, given that it is entirely conceivable within the scope of the present invention that this axis of the stem is inclined relative to the vertical) which is constant or decreasing. A head part 18 of the fastening element protrudes laterally from the stem part 17.

Within the scope of the present invention, a hook, mushroom or fastening element comprises two parts, namely a stem part and a head part which protrudes laterally from the stem. Below is defined the defining plane between the head and the stem which is such that the head and the stem are each on one side of this plane.

To determine this plane, the rear edge and the front edge of the stem are defined, which are the lines comprising the rearmost points of the external surface of the stem, respectively the furthest to the front of the stem.

For the rear edge, the point M2 is defined as being the point of the edge from which, when moving along the rear edge from the bottom of the stem (in the region of the base) to the top, the line forming the edge starts to have a curved shape, in particular oriented in a direction towards the rear, relative to the part of the edge which is located under this point M2, given that in front of this defining point M2, the rear edge is generally either vertical (cylindrical stem) or inclined to the front (conical stem).

For the front edge, on the side opposing the rear side, the point M1 is defined corresponding to the position where the front edge starts to have a curved shape, given that in front of this point the front edge is generally of vertical rectilinear shape or inclined to the rear.

The defining plane is thus the plane comprising the straight line M1M2 and perpendicular and parallel to the direction CD.

For example, in the case where the cross section of the stem is rectangular or square and thus comprises four corners, two defining front points and two defining rear points of the head are defined which are located on the respective edges of the stem.

At the front, on the side opposing the rear side, the two points correspond at the position where the front edges start to have a curved shape, after having had a shape which is vertical and rectilinear or inclined towards the rear.

Figure 12:
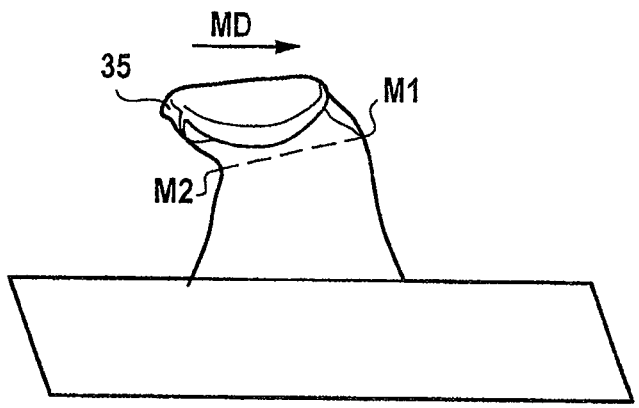
FIG. 12 is a view from the side (CD) of the fastening element of FIG. 11.
Figure 15:
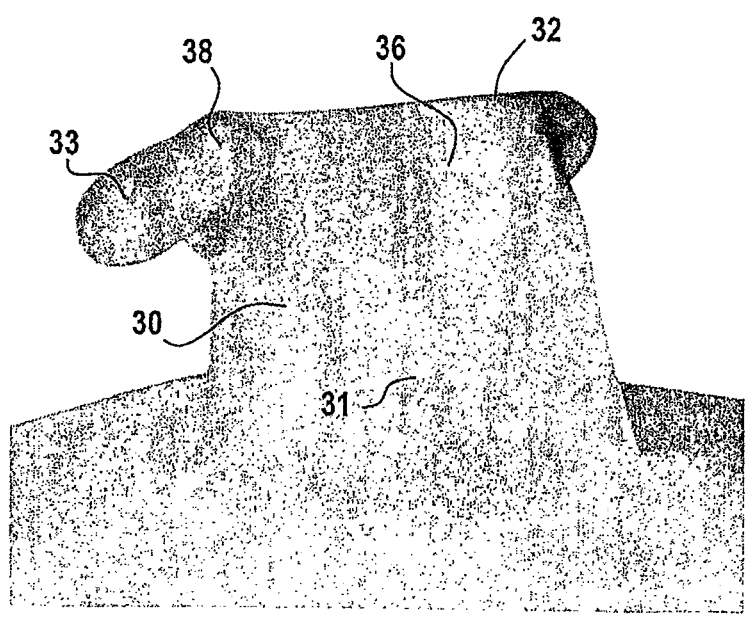
FIGS. 15 to 19 are photographic reproductions of the fastening element shown schematically in FIGS. 5 to 7 and 11 to 14.
Figure 13:
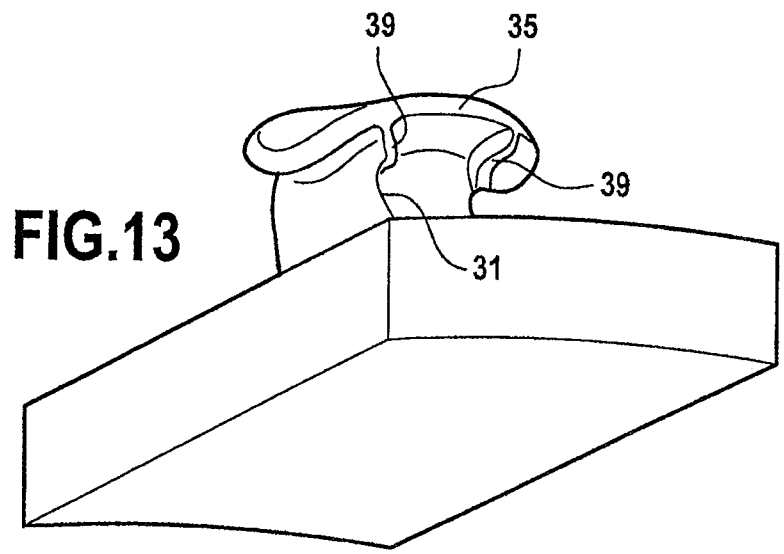
FIG. 13 is a view in rear perspective from below of the fastening element of FIGS. 11 and 12.
Figure 14:
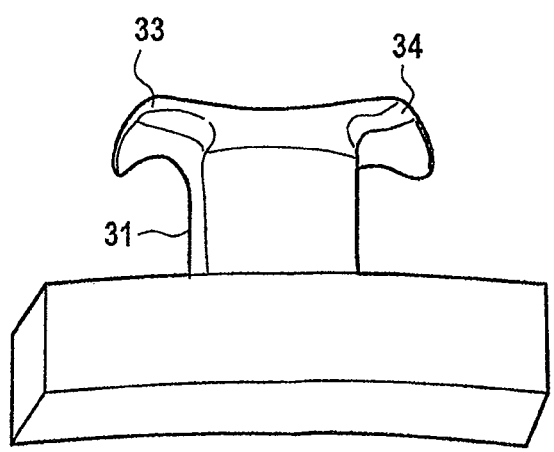
FIG. 14 is a view in front perspective from below of the fastening element of FIGS. 11 to 13.
Figure 16:
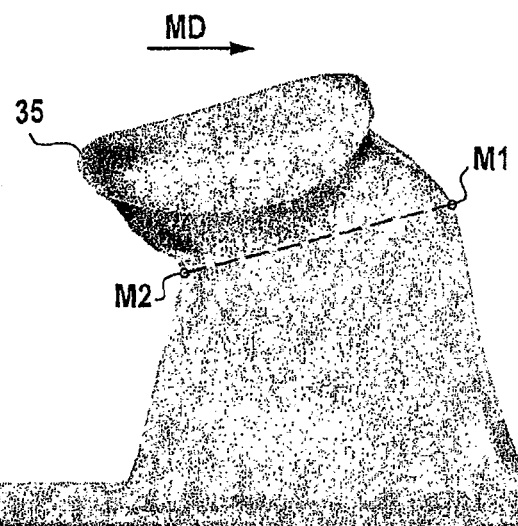
Figure 17:
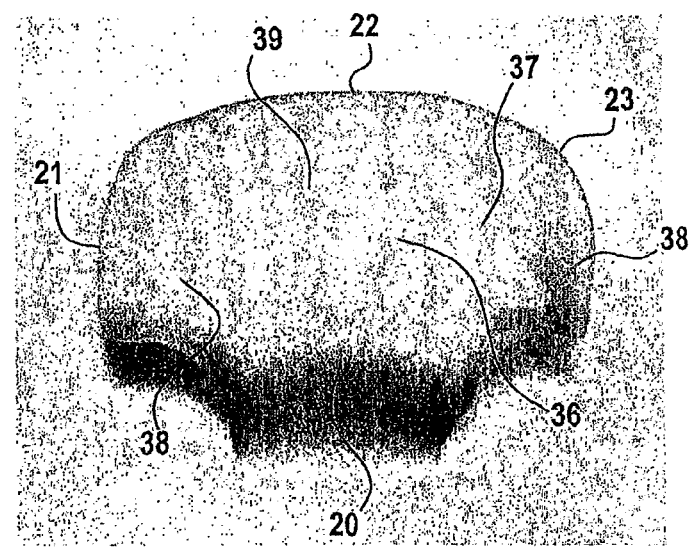
Figure 18:
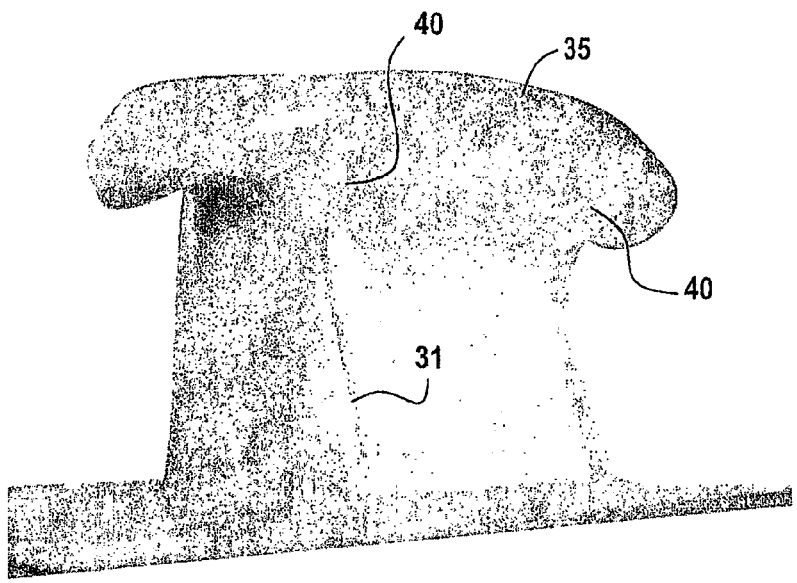
Figure 19:
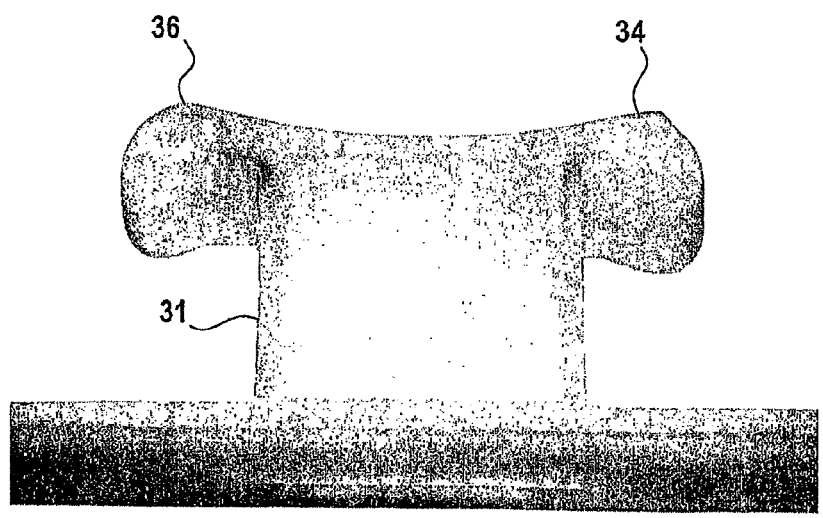

Thus, by way of example, in the embodiment of FIGS. 11 to 14, as may be seen in FIG. 12, the straight line M1M2 has been shown which is inclined downwards and rearwards, in particular by an angle of approximately 10° and which is generally between 1° and 20°. In the case shown, the points M1 and M2 are duplicated as there are two edges on each side (one edge per corner of the rectangle or square forming the section of the stem).

In each plane in longitudinal section of the hook, a curve is defined corresponding to the lower surface of the head which protrudes from the stem to the right and to the left of the stem in the plane. Each curve to the right and to the left comprises a point Ph which is the highest and a point Pb which is the lowest, respectively to the left or right of the highest point.

As indicated above, the projection of the hook, mushroom or fastening element is defined in a given radial longitudinal half-section plane, as being the angle between the horizontal or the base plane of the sheet from where the fastening element originates and the straight line passing through the two points Pb and Ph. The larger the angle, the greater the projection of the head in the given plane. The external peripheral edge of the head is defined as being the curve Cb comprising all the points Pb.

As may be seen in FIGS. 4 and 5, the greatest fastening angle to the left or to the right (the two wings are symmetrical), is equal to a and is strictly positive, the straight line PhPb shown being inclined downwards in the left radial half-plane of FIG. 6 whilst the fastening angle which is the greatest to the rear b shown in FIG. 5 is negative (the straight line PhPB shown being inclined upwards in the rear radial half-plane of FIG. 5) and is thus smaller than the angle a.

Figure 9:
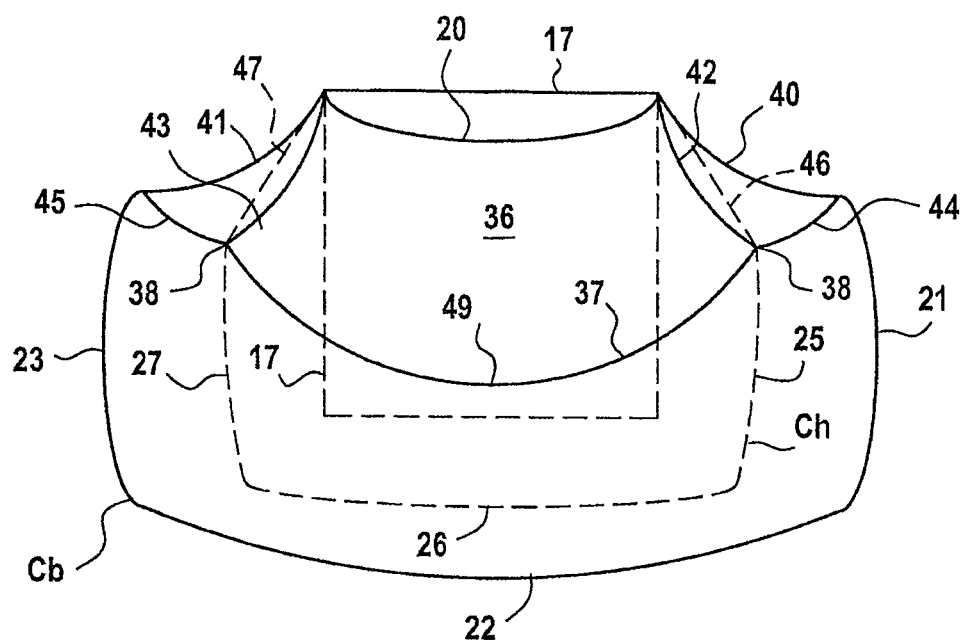
FIG. 9 is the view of FIG. 7 in larger scale.
Figure 11:
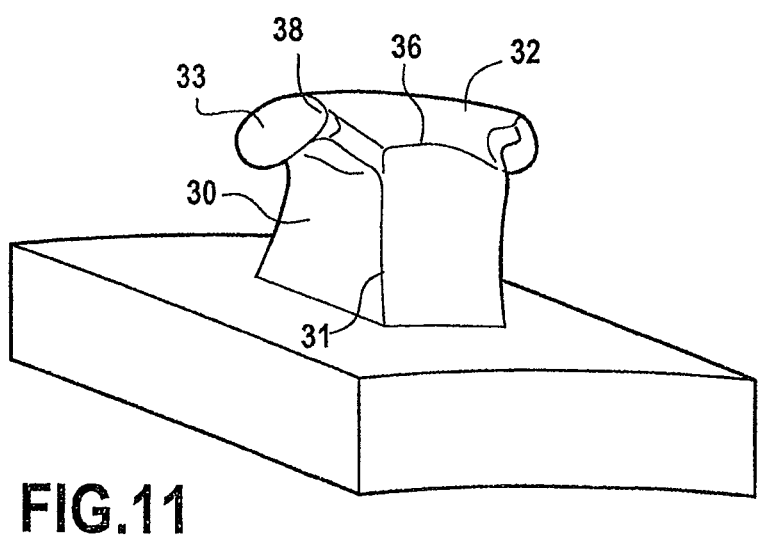
FIG. 11 is a view in front perspective of the fastening element of FIGS. 5 to 7.

As may be seen in FIG. 7 or in enlarged manner in FIG. 9, the curve Cb, which corresponds to the external edge of the head, comprises a front curved segment 20, a right intermediate segment 40, a left intermediate segment 41, a right lateral curved segment 21, a rear curved segment 22 and a left lateral curved segment 23.

Similarly, the curve Ch (dotted in FIG. 9) comprises a front curved segment 20 (identical to the front curved segment of the curve Cb, since the head along this section does not protrude from the stem), a right intermediate segment 46, a right lateral curved segment 25, a rear curved segment 26, a left lateral curved segment 27 and a left intermediate segment 47.

These segments 20 to 27 and 40, 41, 46 and 47 may be roughly equated to circular arcs.

The concavity of the front segment 20 is turned towards the front. The concavity of the rear segment 22 is turned towards the front. The concavities of the segments 21, 22, 23, 25, 26, 27 are turned towards the stem.

The concavity of the intermediate segments 40 to 47 is turned towards the exterior of the element.

The zone respectively defined by the segments 40 and 42 and 41 and 43 has a concave surface of which the concavity is turned towards the exterior of the element.

The concavity of the rear segment 26 is turned to the front. The concavities of the segments 25 and 27 are turned towards the stem, facing one another.

The curvature of the segment 26 is smaller than that of the segment 22 (the radius of curvature of the segment 26 is greater than that of the segment 22).

The curvature of the segment 21 is greater than that of the segment 25 (the radius of curvature of the segment 21 is smaller than that of the segment 25).

The curvature of the segment 23 is greater than that of the segment 27 (the radius of curvature of the segment 23 is smaller than that of the segment 27).

Substantially along the entire segment 22 and, in particular, at its central point or furthest to the rear, the projection of the head is substantially equal to zero.

Over substantially the entire segment 23 (respectively 21) the projection of the head is greater than the greatest projection of the head over the rear segment.

Thus over the lateral zones of the head of the fastening element there is a large projection which makes it possible to ensure excellent behaviour in traction of a loop and over the front zones there are small projections which make it possible for the loop to be guided easily to cooperate with the lateral wings of the head.

Moreover, two intermediate segments 40 and 41 extend between the segment 20 and respectively the segments 21 and 23.

In FIGS. 11 to 14 various views in perspective have been shown of the embodiment of FIGS. 5 to 7.

The fastening element comprises a stem part 30 of rectangular or square cross section (parallel to the base strip from which the fastening element originates), comprising four corners. Thus, along the height of the stem 30, four edges 31 extend upwards from the base substantially as far as the level from which the head part 32 of the fastening element extends. The cross section of the stem has a rectangular or square surface area which decreases from the base as far as the level where the head part commences. It could also be constant.

On two opposing sides in the direction CD (viewing axis of FIG. 12), the head comprises two wings 33, 34 of which the external edges correspond to the segments 21 and 23. On the front side in the direction MD (indicated in FIG. 12) the head does not protrude from the stem. On the rear side in the direction MD (to the left of FIG. 12) the head comprises a projecting part 35 of which the external edge corresponds to the portion 22.

The fastening projection or fastening angle of the wings at the point which is the most remote from the stem in the direction CD is greater than all the fastening projections of the projecting part.

The upper surface of the head comprises on the rear side a concave region 36 of which the concavity is turned in a direction which is away from the fastening element, in particular upwards. This concave region is defined at the rear by a ridge line 37 and to the front by the stem, in particular by the portion 20.

The ridge line 37 consists of a right portion 42, a central portion and a left portion 43. The two right and left portions 42 and 43 extend from the junction of the portion 20 and respectively the intermediate right and left portions 40 and 41, respectively as far as two right and left apexes 38, between which the central portion of the ridge line extends. This central portion comprises the rearmost central point 49.

Moreover, two right and left intermediate ridge lines 44 and 45 connect the front ends of the edges or portions 21 and 23 of the right and left wings to the two right and left apexes 38 respectively.

The external surface of the head comprises, apart from the concave surface 36, two additional right and left concave surfaces with a concavity turned towards the outside and which are defined respectively by the portions 40, 42, 44 and 41, 43, 45.

The two apexes 38 are the two highest points of the upper surface of the fastening element. The presence of these two highest apexes 38 has the advantage that they guide the loops intended to cooperate with the fastening element, either towards the fastening element immediately to the front, or towards the wings 33, 34 such that the loops are particularly well fastened to the fastening elements and a male-female touch-and-close element is obtained having an excellent tensile strength and/or peel strength.

On the side of the projecting part 35, two ribs 39 extend from the upper ends of the rear edges 31 of the stem as far as the external edge 20 (position of the points Pb) of the head. These ribs have the shape of a thickening having a ridge line continuing from the rear edges 31. They extend as far as the external edge of the head, at two points which are located on the rear side in the direction MD by being offset laterally relative to the stem in the direction CD. These two ribs provide the fastening element with a greater tensile strength and/or peel strength when cooperating with the loops.

On the other side of the ridge line 37 relative to the concave region 36, i.e. on the rear side in the direction MD, the upper surface of the head is convex having its convexity turned upwards, the region being defined by the rear external edge of the projecting part, by the external edges of the two wings, by the part of the ridge line 37 which extends between the two apexes 38 and by the two intermediate ridge portions 44 and 45.

The two wings 33, 34 have an external edge (position of the points Pb) which has the shape of a convex curvilinear curve (portions 21 and 23) of which the convexity is turned in the direction which is away from the fastening element in the direction CD.

For each wing, the projecting fastening angle increases from the points Pb located below the end points 38 passing to the rear in the direction MD. This increase in the projecting angle takes place as far as an intermediate point corresponding substantially to the point of the convex curvilinear curve of the edge of the wing which is the most remote from the stem. Then this projection decreases as far as the ribs 39 where the external edge ceases to be that of the wings, to become that of the extension which has a substantially zero projecting angle.

According to a preferred embodiment of the invention
- the base strip has a thickness of between 0.05 mm and 0.5 mm.
- the stem has a height measured from the base to the apex along the perpendicular from the base which is between 0.1 mm and 2.5 mm.
- the head protrudes from the stem on the rear side, measured in the direction MD by a distance f of between 0.5% and 100% of the dimension of the section of the stem in this direction.
- in the direction CD, the head protrudes by a distance measured in the direction CD, in the region of the rear end of the stem, by a maximum distance e of between 50% and 500% of the dimension of the cross section of the stem in this direction.

The circle $C_i$ inscribed in the head is defined as being the circle of which the centre O1 is located half-way between the extreme front point P1 in the direction MD in the view from above of the fastening element (i.e. the point of the upper surface of the head which is furthest to the front in the direction MD) and the extreme rear point P2 in the direction MD in the view from above of the fastening element (i.e. the point of the upper surface of the head which is the furthest to the rear in the direction MD) on the straight line passing through these two points and of which the radius is equal to this half distance.

Preferably, the external peripheral edges of the left and right wings each extend over a length which corresponds to a circular arc B on the circle Ci which is equal in FIG. 8 to approximately 100° and which may generally be between 60° and 140°. The external peripheral edge of the projecting part extends over a length which corresponds to a circular arc C on the circle Ci which is equal in FIG. 8 to approximately 80° and which may generally be between 40° and 120°. Finally, the external peripheral edge along which the head does not protrude from the stem extends over a length which corresponds to a circular arc A on the circle Ci which is equal in FIG. 8 to approximately 80° and which may generally be between 40° and 120°.

The invention claimed is:

1. A sheet having fastening elements, comprising a base strip and at least one fastening element made from said base strip, said fastening element comprising a stem part and a head part protruding laterally from said stem part in a left CD transverse direction; in a right CD transverse direction and in a MD longitudinal direction, perpendicular to said left and right CD transverse directions, said head part having a left Pb point being the point of the head which is the most remote from the stem in the left transverse direction and a left Ph point which is the first point of a lower surface of the head facing said base strip and leaving the stem towards said left Pb point; a right Pb point being the point of the head which is the most remote from the stem in the right transverse direction and a right Ph point which is the first point of a lower surface of the head facing said base strip and leaving the stem towards said right Pb point; and a rear Pb point being the point of the head which is the most remote from the stem in the MD longitudinal direction and a rear Ph point which is the first point of a lower surface of the head facing said base strip and leaving the stem towards said rear Pb point, a fastening angle the greatest to the left being the angle made between a left straight line, extending from said left Ph point to said left Pb point, and the left CD transverse direction; a fastening angle the greatest to the right being the angle made between a right straight line, extending from said right Ph point to said right Pb point, and the right CD transverse direction; a fastening angle the greatest to the rear being the angle made between a rear straight line, extending from said rear Ph point to said rear Pb point, and the MD longitudinal direction; and wherein said rear Ph point is different from said rear Pb point, and said fastening angle the greatest to the rear is smaller than said fastening angle the greatest to the right and smaller than said fastening angle the greatest to the left.

2. The sheet according to claim 1, characterized in that the head part, on a front part on the side opposing the projecting part, does not protrude laterally from the stem part.

3. The sheet according to claim 1, characterized in that the stem part has a substantially rectangular shape in cross section.

4. The sheet according to claim 3, characterized in that a stem-head defining plane is such that said head part and said stem part are each on a respective side of said stem-head defining plane and said stem-head defining plane is inclined downwards in the direction towards the rear relative to the plane of the base.

5. The sheet according to claim 1, characterized in that on the side opposing the projecting part, an upper surface of the head part includes a concave region of which the concavity is turned in a direction which is away from the fastening element, this concave region being defined to the rear by a ridge line.

6. A sheet having fastening elements, comprising a base strip, in particular made of thermoplastic material and at least one fastening element made from the strip, the fastening element consisting of a stem part and a head part protruding laterally from the stem part, the head part comprising two left and right wings protruding laterally from the stem part in a transverse direction, or CD, respectively having a fastening angle which is the greatest to the left and right; and on the other hand, radially between the two wings, a rear projecting part protruding from the stem on the rear side in a direction MD perpendicular to the direction CD, having a fastening angle which is the greatest to the rear, characterized in that the two fastening angles which are the greatest to the left and right are greater than the fastening angle which is the greatest to the rear, the stem part has a substantially rectangular shape in cross section and that the head part comprises two protuberances in the form of ribs which extend from edges of the stem part formed by its rear corners on the side of the projecting part as far as the apex thereof.

7. The sheet according to claim 6, characterized in that each rib has a ridge continuing from the respective edge of the stem from which it extends.

8. A sheet having fastening elements, comprising a base strip, in particular made of thermoplastic material and at least one fastening element made from the strip, the fastening element consisting of a stem part and a head part protruding laterally from the stem part, the head part comprising two left and right wings protruding laterally from the stem part in a transverse direction, or CD, respectively having a fastening angle which is the greatest to the left and right; and on the other hand, radially between the two wings, a rear projecting part protruding from the stem on the rear side in a direction MD perpendicular to the direction CD, having a fastening angle which is the greatest to the rear, characterized in that the two fastening angles which are the greatest to the left and right are greater than the fastening angle which is the greatest to the rear, that on the side opposing the projecting part, an upper surface of the head part comprising a concave region of which the concavity is turned in a direction which is away from the fastening element, this concave region being defined to the rear by a ridge line, and that the ridge line comprises two right and left apexes which are the two highest points of the head part respectively to the right and to the left of the front-rear axis of the head part passing through the axis of the stem part.

9. The sheet according to claim 7, characterized in that on the other side of the ridge line relative to the concave region on the rear side in the direction MD, the upper surface of the head part is convex, having its convexity turned upwards, the region being defined by the rear external edge of the projection, by the external edges of the two wings, by the part of the ridge line which extends between the two apexes and by two intermediate ridge sections.

10. The sheet according to claim 8, characterized in that the two points are closer to the front edge than the rear edge.

11. A sheet having fastening elements, comprising a base strip, in particular made of thermoplastic material and at least one fastening element made from the strip, the fastening element consisting of a stem part and a head part protruding laterally from the stem part, the head part comprising left and right wings protruding laterally from the stem part in a transverse direction, or CD, respectively having a fastening angle which is the greatest to the left and right; and on the other hand, radially between the two wings, a rear projecting part protruding from the stem on the rear side in a direction MD perpendicular to the direction CD, having a fastening angle which is the greatest to the rear, characterized in that the two fastening angles which are the greatest to the left and right are greater than the fastening angle which is the greatest to the rear and wherein on the side opposing the projecting part, an upper surface of the head part includes a concave region of which the concavity is turned in a direction which is away from the fastening element, this concave region being defined to the rear by a ridge line.

\* \* \* \* \*